3,363,990
PROCESS FOR DETERMINING THE NITROGEN CONTENT IN SOLIDS OR LIQUIDS
Leendert Blom, Sittard, Gerrit Kateman and Karl A. Potrafke, Geleen, and Petrus J. Stornebrink, Amsterdam, Netherlands, assignors to Stamicarbon N.V., Heerlen, Netherlands
Filed Sept. 18, 1964, Ser. No. 397,435
Claims priority, application Netherlands, Sept. 23, 1963, 298,225; Nov. 25, 1963, 300,958
1 Claim. (Cl. 23—230)

This invention relates to a process and apparatus for determining the content of bound nitrogen in solids or liquids. More particularly, it relates to a process wherein the nitrogen in solids or liquids is converted into ammonia, absorbed in an aqueous or acidic solutions and titrated.

Heretofore, methods for determining the nitrogen content of fertilizers have been employed wherein samples of the fertilizer are mixed with a large amount of water. Ammonia which is liberated by the reaction with an alkali or alkali carbonate is carried off with water vapor. Such known methods, however, have been found to be disadvantageous in that complete expulsion and transfer of the ammonia require relatively long periods of time, generally at least about twenty minutes, thus seriously curtailing rapid analysis of a large number of samples. Moreover, existing methods do not lend themselves easily to automation.

Efforts to improve existing methods have been directed to reducing the amount of water employed. These efforts have not, however, produced any marked increase in the efficiency or rapidity of the analysis.

It is therefore an object of the instant invention to provide a process and apparatus for determining the content of bound nitrogen in a liquid or solid which overcomes the disadvantages of the prior art.

It is another object of the instant invention to provide an improved process and apparatus for determining the nitrogen content of a solid or liquid in a rapid manner thereby permitting analysis of an extensive number of such samples in a relatively short period of time.

Still another object of the instant invention is to provide a continuous method, and apparatus therefor, of determining the nitrogen content of a plurality of liquid or solid samples.

A further object of the instant invention is to provide an improved method and apparatus for determination of the nitrogen content of a liquid or solid sample which comprises converting and/or releasing the nitrogen components thereof to ammonia, absorbing the ammonia in water or acid and thereafter titrating the absorbed ammonia to determine the nitrogen content of the sample.

Figure 1:
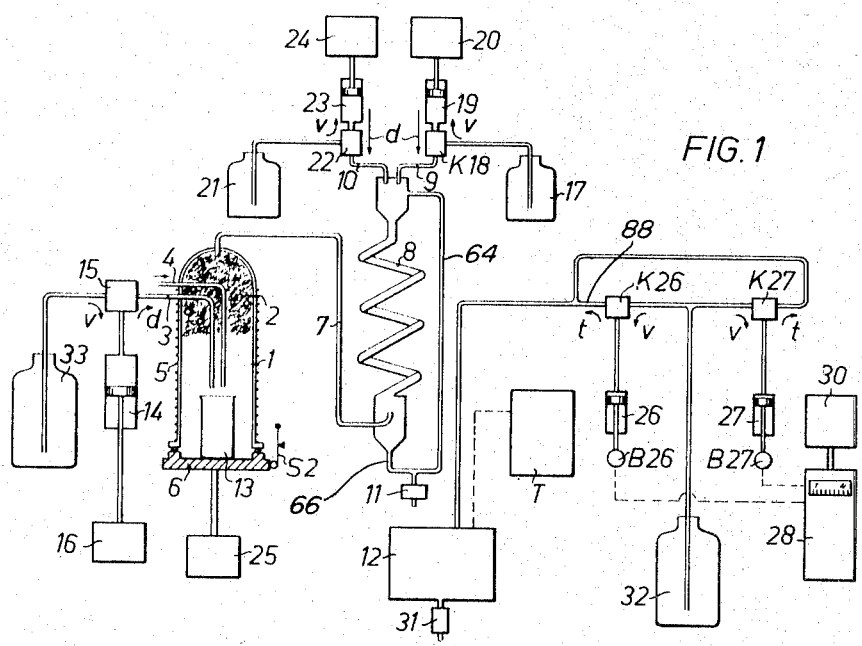
Figure 2:
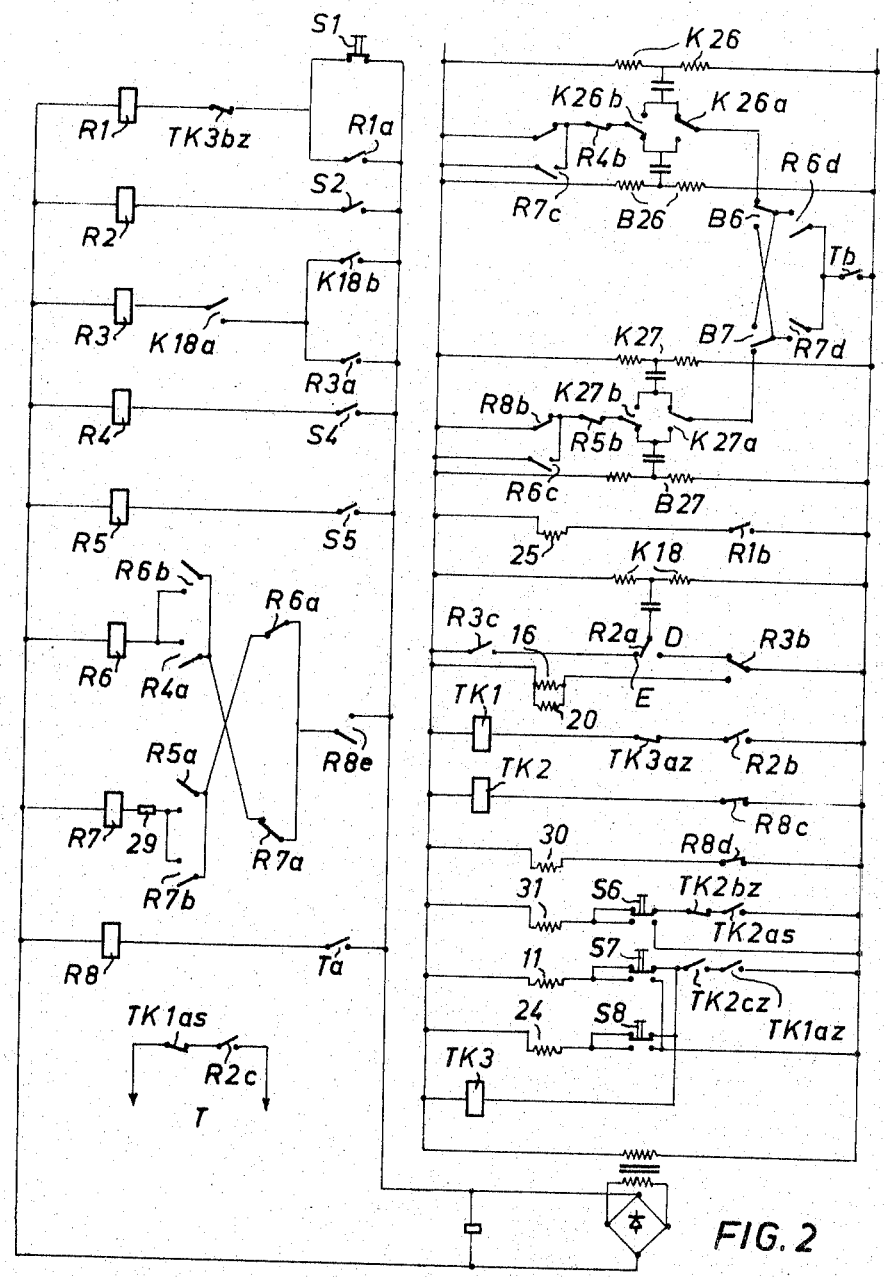

These and various other objects, advantages and adaptations of the invention will become apparent from the following description of certain exemplary modes of procedure. In order to illustrate and facilitate understanding of the invention, reference will be had to the appended drawings, in which:

FIGURE 1 schematically illustrates the analysis procedure and system in accordance with the instant invention; and FIGURE 2 illustrates a circuit diagram suitable for operation of the system and process illustrated in FIGURE 1.

It has now been surprisingly found that the objects of the instant invention can be achieved by treating the sample to be analyzed in a concentrated aqueous reaction mixture, producing a very fast temperature rise in the reaction mixture, expelling the ammonia produced from the nitrogen content of the sample during the reaction from the reaction vessel with a stream of an inert gas, driving said expelled ammonia through a mist trap maintained at a temperature at least about the ambient boiling point of water, absorbing said ammonia in an aqueous acidic medium and thereafter titrating the absorbed ammonia to determine the nitrogen content of the sample.

In accordance with this invention the following terms have the following meanings: "oxygen-bound nitrogen" refers to nitrogen which is bonded to oxygen as in nitrates and nitrites, and hydroxyl amines; "hydrogen-bound nitrogen" on the other hand includes generally the other forms of nitrogen in the sample, particularly nitrogen bonded to at least one hydrogen atom but excluding any nitrogen bonded to an oxygen atom.

In one embodiment of the instant invention a sample to be analyzed for its nitrogen content can be treated first to liberate the hydrogen-bound nitrogen and then the oxygen-bound nitrogen is reduced and also liberated as ammonia, the ammonia being recovered and processed in the manner set forth above to determine the total nitrogen content of the sample.

As a further embodiment of the invention the hydrogen-bound nitrogen content only of the sample is determined by treating the same with an alkali or an alkali carbonate to release the said hydrogen-bound nitrogen in the form of ammonia, the ammonia being processed as hereinbefore described.

In another embodiment of the invention the oxygen-bound nitrogen content of a sample not containing hydrogen-bound nitrogen can be directly determined by reducing the oxygen-bound nitrogen by Devarda's alloy, or by equivalent means, to produce ammonia, the ammonia being treated as above to determine the nitrogen bound to oxygen content of the sample. As is known to the art, Devarda's alloy contains 5 parts zinc, 45 parts aluminum and 50 parts copper.

In still another embodiment of the invention the hydrogen-bound nitrogen content is indirectly determined by treating a first portion of a sample containing both hydrogen-bound nitrogen and oxygen-bound nitrogen with an oxidizing agent such as sodium hypobromite in the presence, preferably, of an alkali such as sodium bicarbonate or sodium hydroxide. This treatment removes the said hydrogen-bound nitrogen as elemental nitrogen gas, $N_2$, which is expelled to the atmosphere. Thereafter the reaction mass is treated with Devarda's alloy thereby reducing the oxygen-bound nitrogen content to ammonia, and the ammonia is treated as hereinbefore described, to determine the oxygen-bound nitrogen content. A second portion of the sample is treated with Devarda's alloy to effect the liberation of both the hydrogen-bound nitrogen and the oxygen-bound nitrogen. As to ammonia, and titrating the ammonia as described above, by substracting the results obtained from the first portion from the results obtained from the second portion of the sample, the difference determines the hydrogen-bound nitrogen content of the sample under analysis.

In accordance with the instant invention the liberation of ammonia and its transfer to a titrating zone is accomplished in a period of time ranging from about 0.5 to 3 minutes. This rapid rate of analyzing nitrogen-containing materials represents, timewise, a greater than 500 percent increase in the efficiency of the operation.

As stated above, the reaction mixture is maintained in concentrated form. In procedures where Devarda's alloy is not employed, the weight of water present in the reaction mixture is, generally, not more than 40 times greater than the weight of reactants on a water-free basis and, preferably, from about 20 to 25 times greater. When using Devarda's alloy, however, the weight of water present in the reaction mixture is, generally, not more than 5 times greater than the weight of reactants (Devarda's alloy plus sample) on a water-free basis and, preferably, from about 3 to 4 times greater. By way of comparison, prior art practices have utilized 50–200 times more water than that used in the instant invention. The substantial reduction in the amount of aqueous medium employed in the instant invention permits the use of relatively smaller reaction and collecting apparatus which in turn not only affords determinations as accurate as prior art methods, but also significantly increases the rapidity or rate at which these determinations can be made.

The temperature of the reaction should be brought to the boiling temperature in at most a relatively short period of time. Generally, this period of time should be within from about 5 to 20 seconds. When practicing an embodiment of this invention wherein Devarda's alloy is not utilized, the temperature rise can conveniently be accomplished by, for instance, a heating coil associated with the reaction zone. When a Devarda's alloy is employed, extrinsic heating means are not necessary as the heat of the exothermic reaction between the Devarda's alloy and the alkali charged to the reaction zone provides sufficient heat at a rate sufficient to effect a temperature rise in the reaction mass within the range specified above. Such a method permits a considerable simplification of the apparatus employed since means for supplying external heat can be omitted. Moreover, the hydrogen evolved assists in expelling ammonia produced in the reaction zone.

It has also been found advantageous to preheat the alkali to a temperature ranging from about 35 to 45° C., preferably, about 40° C. in order to reduce the time needed to reach the boiling point. Operations involving the use fo Devarda's alloy, i.e. the reaction of Devarda's alloy with the alkali and the transfer of ammonia produced in the reaction to the titrating zone have been completed in 30 to 45 seconds.

The instant invention also provides novel apparatus employed in the determination of nitrogen content of a nitrogen-containing material. As shown in FIGURE 1, the apparatus, generally, comprises a reactor 13, housed in a collecting vessel 1 having a dome shaped top, a mist trap 2 therein and a movable bottom member 6 actuated by control valve 25. Leading to the collecting vessel 1 is conduit 4 provided for the introduction of an inert gas thereto and conduit 3 provided for the introduction of an alkali from an alkali source 33 by means of an alkali feed means 14 responsive to control valve 16, said alkali source 33 and alkali feed means being in communication with valve means 15, also in communication with collecting vessel 1 through conduit 3. Leading from the top of collecting vessel 1 is conduit 7 in communication with the lower portion of absorption vessel 8. Leading to the top portion of absorption vessel 8 is a first conduit 9 in communication with valve means K18 which is also in communication through a conduit with absorbing medium source 17, said absorbing medium being, preferably, an aqueous acidic medium or, for instance, water. Also in communication with valve means K18 is absorbing medium feed means 19 responsive to control valve 20.

Also leading to the top portion of absorption vessel 8 is a second conduit 10 in communication with valve means 22 which is also in communication through a conduit with absorption vessel washing medium source 21, said washing medium being, preferably, water. Also in communication with valve means 22 is washing medium feed means 23, responsive to control valve 24.

Leading from the upper portion of absorbing vessel 8 is a further conduit in communication with a lower conduit, both conduits 64 and 66 being in communication through a T joint with absorption vessel outlet valve 11.

Disposed beneath the absorption vessel outlet valve 11 is a titrating vessel 12 provided with a drain valve 31, said vessel being provided with automatic titration means T. Leading also to titrating vessel 12 is a conduit provided to admit titrating medium from titrating medium source 32 through a network of interconnecting conduits. As shown, leading from titrating medium source 32 is a conduit which is in communication with a conduit leading to valve means K26 which in turn is in communication with a first piston-fitted titrating medium measuring means 26 and a first outlet conduit 88 communicating to titrating vessel 12. Source 32 is also in communication with a conduit leading to valve means K27 which in turn is in communication with a second piston-fitted titrating medium measuring means 27 and second outlet conduit in communication also with conduit titrating vessel 12. First and second titrating medium measuring means 26 and 27 are responsive to automatic titration means T and can be actuated simultaneously or sequentially as desired. The measuring means are 26 and 27 actuated by means such as motors B26 and B27, respectively.

The amount of titrating medium measured by said means 26 and 27 and fed to the titrating vessel 12 can be indicated on recorder means 28 operated by relay means 30, said recorder means being responsive to the position of pistons and of measuring means 26 and 27, respectively.

In a preferred embodiment of the invention the closing of the collecting vessel actuates the automatic titrating means T for titrating the ammonia produced in a previous reaction. Moreover, in the preferred embodiment the collecting vessel is opened only after the titration of the previous sample has terminated and a controlling device is provided for influencing the nitrogen content of the solid or liquid nitrogen-containing material. The controlling device 30 is piloted by a meter 28 which indicates the result of the titration.

The process including the automatic titrating means shown in FIGURE 2 will now be more fully described.

When the reaction vessel 13 has been placed on the bottom 6, a knob S1 is depressed as a result of which a relay R1 is actuated and held by means of contact R1a. Contact R1b now actuates control valve 25 with the result that bottom 6 is raised. When collecting vessel 1 closes, a switch S2 is closed and relay R2 is actuated. Contact R2a is now switched from E to D which causes the threeway valve K18 to shift from the "filling" to the "feeding" position. If this valve is in the correct position, contacts K18b and K18a have been switched with the result that relay R3 is actuated and held by contact R3a. Contact R3b is switched and this stops the motor of valve K18 and operates the control valves 16 and 20. Valve 16 operates alkali feed device 14 which supplies alkali to the reaction vessel 13, while valve 20 operates absorbing medium feed device 19 which feeds, for instance, an acid to the absorption vessel 8. Contact R3c closes so that when at a later moment contact R2a is switched back again, the three-way valve K18 is returned to the "filling" position.

Due to the actuation of relay R2, contact R2b has also been switched, thereby starting timing clock TK1 which determines the time needed for the reaction, the expulsion of ammonia from the collecting vessel and the transfer of the ammonia to the titrating vessel 12. A contact R2c starts titrator T which is effected by one impulse only. Immediately after the titrator has been started, the circuit across contact R2c becomes currentless again due to breaking of contacts TK1as of timing clock TK1. When the titrator starts, the contacts Ta and Tb are closed. Contact Ta actuates relay R8.

Automatic titration means T is provided with burettes 26 and 27 for feeding dilute alkali from storage vessel 32. Titrator T determines the pH of the liquid in the titration vessel 12 and adds alkali from the burettes 26 and/or 27 until the pH reaches a predetermined value, for instance, 5.6. The amount of alkali added is a measure of the ammonia content and hence of the nitrogen content of the sample. Consequently, the position of the burette pistons at the end of the titration can be calibrated to indicate this content, the position being recorded by recorder 28.

If at the moment of actuation of relay R8, burette 26 only is filled then contact S4 is automatically closed, relay R4 is actuated and contact R4a is closed. Closure of contact R8a consequently causes actuation of relay R6. Contact R6a prevents actuation of relay R7 at a later moment, that is to say when burette 27 is filled, with the result that, successively, contact S5 is closed, relay R5 is actuated and contact R5a is closed. The circuit, consequently, chooses burette 26.

If at the moment of actuation of relay R8, burette 27 only is filled then relay R7 is actuated with the consequence that burette 27 is chosen.

If at the moment of actuation of relay R8, both burettes are filled, then a time-lag resistance 29, arranged in series with relay R7 will actuate relay R6 so that burette 26 is chosen.

If at the moment of actuation of relay R8 neither of the two burettes is filled then no choice will be made for the time being as both contact S4 and contact S5 are open. The burette that is filled first will be chosen.

If relay R6 is actuated contact R6d closes. Contact Tb has already closed (see above) with the consequence that the three-way valve R26 is now placed in titrating position (t). Contact K26b immediately closes now. This does not cause short-circuiting because contact R4b is open. When three-way valve K26 has reached the final position, contact K26a is switched, which brings the valve to a standstill. Now burette motor B26 is operated as a result of which contact S4 opens and relay R4 is de-energized. Contact R4b closes now. To prevent the valve from returning to the filling position (v), contact R8a has been arranged in series with contact R4b. During the titration this contact is open.

A situation can occur where one burette is too small for completing the titration. If the burette, in this case, burette 26 is empty, it is disconnected and burette 27 is connected by means of contact B6.

The three-way valve K27 of burette 27 is then placed first in the titrating position (t).

At the end of the titration contact Ta opens. Relay R8 is de-energized now and operates the three-way valves K26 and K27 via the contacts R8a and R8b. If burette 27 is already filled contact S5 has closed and relay R5 is actuated. Contact R5b now prevents operation of three-way valve K27 and burette motor B27. Therefore, valve K26 is now moved from titrating position (t) to filling position (v). Contact K26a is now immediately turned into the drawn position, which cannot produce short-circuiting because contact Tb is open. After that, contact K26b is switched, with the result that three-way valve K2 is stopped and the burette motor B26 is cut in.

If one of the burettes, for example, burette 27 is not filled at the start of the titration, means are provided to enable the filling to be accomplished. For this purpose contact R6c which closes when burette 26 is chosen for the titration is arranged parallel to contact R8b. While the titration and the transfer are taking place in the collecting and absorption vessels, the ammonia from the previous sample is titrated. The reaction and transfer times are measured by timing clock TK1. A situation can arise when more time is needed for the titration than for the reaction. In such a situation drain valve 31 is not opened until the titration has stopped. Thereafter, vessel 70 is emptied. Upon completion of the titration, contact R8c starts timing clock TK2 and contact R8d actuates relay 30. This relay operates the recording mechanism of the recorder 28.

A contract TK2as operates drain valve 31 which opens the titration vessel 12. Upon expiration of the time set on the timing clock TK2, contact TK2bz is opened with the result that valve 31 is closed again. At the same moment contact TK2cz closes. If contact TK1az is already closed, which is the case if the time set on timing clock TK1 has expired, drain valve 11 and valve 24 are operated. If, however, contact TK1az has not closed yet, valve 11 and valve 24 are not operated. The contents of absorption vessel 8 flow via valve 11 into titration vessel 12. The absorption vessel is washed with water supplied through the electromagnetic valve 24. Timing clock TK3 is started at the same time. After termination of the time set on clock TK3, contact TK3bz opens and relay R1 is de-energized. As a result bottom 6 lowers. Switch S2 opens and relay R2 is de-energized. Contact R2b opens and timing clocks TK3 stops. Timing clock TK2 stops only when the titration for the next cycle is started. Contact Ta then reactuates the relay and contact R8c causes clock TK2 to stop.

In the case of a total nitrogen determination the whole cycle takes about 70 seconds. One operator can conveniently handle 50 samples in one hour. During the operation the amount of water present during the reaction, preferably, is about 2.5 ml. Generally, not more than about 5 ml. is present since amounts greater than 5 ml. serve only to increase the time required for the analysis.

The elements illustrated in FIGURE 2 as R6b, R7d, R7b, R7c, B7, R7d, K27b, K27d, TK3d2, S6, S7 and S8 comprise the requisite switches and relays utilized for the operation and control of the circuit.

This invention will be further understood from the following examples which are intended to constitute preferred but not limiting illustrations thereof.

EXAMPLE I

In the direct determination of the bound nitrogen content in a nitrogen-containing substance, a sample of 200 mg. of the substance together with 2.5 ml. of water is put into reaction vessel 13, which has a volume of 50 ml. Thereafter, the reaction vessel is placed on bottom 6 and the collecting vessel 1 is closed by means of control valve 25.

Through conduit 3 there is admitted to the reaction vessel 13, 4 ml. of concentrated sodium hydroxide (50%) from storage vessel 33 via conduit 3, valve means 15 and feeding device 14 which is a pipette actuated by control valve 16 and via mist trap 2, which, by means of the heating coil 5 is kept at a temperature of about 100° C. Mounted in vessel 13 is a heating coil to which current is supplied via contacts in the bottom 6.

A reaction is produced which takes from 0.5 to 2 minutes. Through the inert gas inlet 4, nitrogen is supplied at a rate of about 1 liter per minute, to blow the ammonia formed during the reaction through the mist trap 2. Any ammonia taken up in droplets of water is liberated by evaporation of the water in the mist trap 2 which can be made of any suitable material inert to the substances with which it comes in contact. For instance, it can be fabricated from glass or quartz wool. Thereafter, the ammonia is led to the absorption vessel 8 through conduit 7. To this vessel an excess of dilute sulfuric acid is supplied through conduit 9 from storage vessel 17 via a conduit, valve K18 and feeding device 19 which is responsive to control valve 20.

After the absorption vessel 8 is drained into titration vessel 12 via outlet conduit 11, vessel 8 is washed clean with water supplied through conduit 10 from storage vessel 21 via a conduit, valve 22 and feeding device 23 which is responsive to control valve 24.

The absorbed ammonia in titrating vessel 12 was titrated by automatic titrating means T, the amount of ammonia being proportional to the bound nitrogen content of the sample.

EXAMPLE II

In the direct determination of the total nitrogen or nitrate nitrogen content of a nitro-containing material the process of Example I was repeated except that 800 mg. of Devarda's alloy having a particle size less than 0.2 mm. in diameter was added to the sample in the reaction vessel 13. Further, heating of the vessel by heating coil placed in the vessel was omitted since it surprisingly was found that the reaction heat sufficed to attain the temperature for producing ammonia. The reaction and the transfer of ammonia was accomplished within a period ranging from about 30–45 seconds.

EXAMPLE III

In the indirect determination of the content of bound nitrogen of a nitrogen-containing material the heating coil provided to heat the reaction vessel is again omitted.

To make a bound nitrogen determination according to this embodiment of the invention two successive runs are performed. In the first, an oxidizing agent such as sodium hypobromite is charged to the reaction vessel 13, which is outside the collecting vessel 1 and which also contains the nitrogen-containing sample and sodium hydroxide. Nitrogen wholly or partly bound to hydrogen and also any urea, if present, are removed. Sodium sulphite is also added to decompose any excess hypobromite. The removal of ammonia and hypobromite is completed within one minute. To the remaining still hot nitrate solution, there is added one gram of Devarda's alloy. Thereafter, the reaction vessel is immediately placed in the collecting vessel 12 which is then closed.

After approximately 40 seconds all of the ammonia originating from the nitrate has been liberated and titrated in the manner described above.

In the second run, a second sample of the same nitrogen-containing material is treated in the manner outlined in Example II above. The bound nitrogen content of the nitrogen-containing material is calculated as the differences between the results of the first and second runs.

The change over from a direct bound nitrogen determination to a direct nitrogen-bound-to-oxygen determination which combines accuracy with rapidity, makes it possible to use only one apparatus which is both relatively inexpensive and requires little space.

Unless otherwise specified all parts and percentages in the specification and claim are by weight. The foregoing examples illustrate specific processes, several being preferred. It is to be understood that the compositions and conditions can be varied. Therefore as many embodiments of this invention may be made without departing from the spirit and scope thereof and the invention includes all such modifications and variations as come within the scope of the appended claim.

What is claimed is:

1. A process for permitting indirect determination of the hydrogen-bound nitrogen content of a nitrogen-containing substance comprising, mixing said nitrogen-containing substance with an aqueous medium to produce a concentrated aqueous mixture containing said substance, reacting a first aliquant portion of said concentrated aqueous reaction mixture with an alkali and an oxidant to convert and evoke the hydrogen-bound nitrogen as nitrogen gas, said aqueous medium being present in amounts up to 5 times the weight of the reactants calculated on a water-free basis, admixing the residue of said first portion reaction mixture with Devarda's alloy in an amount sufficient to convert all the residual nitrogen content of the portion to ammonia and to produce a rapid temperature rise in the reaction mixture, whereby the temperature of the reaction mixture is brought to the boiling temperature in a period of time ranging from 5–20 seconds, expelling the thus formed ammonia through a zone maintained at a temperature of at least the ambient boiling temperature of water, absorbing this ammonia in a liquid aqueous medium, and titrating the absorbed ammonia thereby determining the oxygen-bound nitrogen content of the nitrogen-containing substance, reacting a second aliquant portion of the said concentrated aqueous reaction mixture with an alkali and Devarda's alloy in an amount sufficient to convert all the nitrogen content thereof to ammonia, and to produce a rapid temperature rise in said second portion of the reaction mixture, whereby the temperature of the reaction mixture is brought to the boiling temperature in a period of time ranging from 5–20 seconds, said aqueous medium being present in amounts up to about 5 times the weight of the reactants calculated on a water-free basis, expelling the ammonia thereby produced in said second reaction with an inert gas, passing said expelled ammonia through a zone maintained at a temperature of at least the ambient boiling temperature of water, absorbing the ammonia in a liquid aqueous medium, and titrating the absorbed ammonia thereby determining the total nitrogen content of the nitrogen-containing substance, so that the difference between the total nitrogen content and oxygen-bound nitrogen content may be determined.

References Cited

UNITED STATES PATENTS

| 3,174,829 | 3/1965 | Stokstad | 23—253 |
| 3,186,800 | 6/1965 | Strickler | 23—253 |

OTHER REFERENCES

Wilson, C. L. et al., Editors, Comprehensive Analytical Chemistry, Elsevier Publishing Co., vol. 1B, (1960) pps. 495–509.

Horwitz, W., Editor, Official Methods of Analysis of the Association of Official Agricultural Chemists, Association of Official Agricultural Chemists, 9th ed. (1960) pps. 12–15.

Welcher, F. J., Editor, Standard Methods of Chemical Analysis, D. Van Nostrand Company, Inc. Apr. 23, 1963 Sixth Edition, vol. 2, Part A. pp. 383–386.

Welcher, F. J., Editor, Standard Methods of Chemical Analysis, D. Van Nostrand Company, Inc. Apr. 23, 1963 Sixth Edition, vol. 2, Part B. pp. 1486–1489.

MORRIS O. WOLK, *Primary Examiner.*

H. A. BIRENBAUM, R. E. SERWIN,
*Assistant Examiners.*